US007868078B2

(12) United States Patent
Jarrell

(10) Patent No.: US 7,868,078 B2
(45) Date of Patent: Jan. 11, 2011

(54) COMPOSITION INCLUDING METAL OXIDE AND POLYMER

(75) Inventor: John D. Jarrell, East Providence, RI (US)

(73) Assignee: Biointraface, Inc. a Rhode Island Corp., East Providence, RI (US)

(*) Notice: Subject to any disclaimer, the term of this patent is extended or adjusted under 35 U.S.C. 154(b) by 0 days.

(21) Appl. No.: 12/253,555

(22) Filed: Oct. 17, 2008

(65) Prior Publication Data

US 2009/0105384 A1    Apr. 23, 2009

Related U.S. Application Data

(60) Provisional application No. 60/981,263, filed on Oct. 19, 2007.

(51) Int. Cl.
| | |
|---|---|
| C08K 3/18 | (2006.01) |
| C08K 3/22 | (2006.01) |
| C08K 5/05 | (2006.01) |
| C08K 3/20 | (2006.01) |
| C08K 3/10 | (2006.01) |
| B01F 17/00 | (2006.01) |
| B29C 47/00 | (2006.01) |
| C04B 26/12 | (2006.01) |
| A61K 6/083 | (2006.01) |
| A61K 8/72 | (2006.01) |
| A61F 2/00 | (2006.01) |
| A61L 24/00 | (2006.01) |
| C09D 5/16 | (2006.01) |
| C08G 77/00 | (2006.01) |
| C08G 77/06 | (2006.01) |

(52) U.S. Cl. ............... 524/430; 524/388; 524/389; 524/408; 524/413; 524/431; 523/105; 523/113; 523/122; 528/10; 528/12

(58) Field of Classification Search .......... 524/398, 524/399, 430, 431; 523/113, 122
See application file for complete search history.

(56) References Cited

U.S. PATENT DOCUMENTS

| | | | |
|---|---|---|---|
| 5,489,304 A | 2/1996 | Orgill et al. | |
| 6,066,581 A | 5/2000 | Chivukula et al. | |
| 6,403,689 B1 * | 6/2002 | Lehaut et al. | 524/431 |
| 6,548,590 B1 * | 4/2003 | Koloski et al. | 524/492 |
| 6,599,631 B2 * | 7/2003 | Kambe et al. | 428/447 |
| 6,743,517 B2 | 6/2004 | Nakamura et al. | |
| 6,810,288 B2 | 10/2004 | Joshi | |
| 7,014,799 B2 | 3/2006 | Yang et al. | |
| 7,118,727 B2 | 10/2006 | Williams | |
| 7,175,611 B2 | 2/2007 | Mitchnick | |
| 7,176,245 B2 | 2/2007 | Stucky et al. | |
| 7,223,378 B2 | 5/2007 | Sterzel | |
| 7,226,966 B2 * | 6/2007 | Kambe et al. | 524/432 |
| 2002/0192196 A1 | 12/2002 | AllenHoffmann | |
| 2003/0031438 A1 * | 2/2003 | Kambe et al. | 385/122 |
| 2003/0091542 A1 | 5/2003 | Eberhardt et al. | |
| 2003/0116273 A1 | 6/2003 | Nakamura et al. | |
| 2003/0157248 A1 | 8/2003 | Watkins et al. | |
| 2003/0229319 A1 * | 12/2003 | Mitchnick | 604/265 |
| 2004/0161473 A1 | 8/2004 | Joshi | |
| 2005/0170192 A1 * | 8/2005 | Kambe et al. | 428/447 |
| 2006/0161256 A1 * | 7/2006 | Ziegler et al. | 623/11.11 |
| 2007/0071879 A1 * | 3/2007 | Rypacek et al. | 427/2.1 |
| 2007/0196663 A1 | 8/2007 | Schwartz et al. | |
| 2007/0202342 A1 | 8/2007 | Whiteford et al. | |
| 2008/0004390 A1 * | 1/2008 | Aoshima et al. | 524/430 |
| 2009/0317624 A1 * | 12/2009 | Yoshioka et al. | 428/328 |

FOREIGN PATENT DOCUMENTS

WO    WO-2009/052429 A1 *  4/2009

OTHER PUBLICATIONS

Iketani, K., Sun, R.D., Toki, M., Hirota, K., Yamaguchi, O. "Sol-gel-derived TiO2/poly(dimethylsiloxane) hybrid films and their photocatalytic activities." Journal of Physics and Chemistry of Solids, vol. 64, p. 507-513, 2003.*
Dow Corning Toray PRX 413 Fluid Material Safety Data Sheet.*
Jarrell, J.D., Eun, T.H., Samale, M., Briant, C., Sheldon, B.W., Morgan, J.W. "Metal oxide coated cell culture arrays for rapid biological screening." Journal of Biomedical Materials Research Part A: vol. 83A, p. 853-860.*
Luo, X., Congji, Z., Luther-Davies, B. Journal of Sol-Gel Science and Technology, vol. 32, p. 297-301, 2004.*
Fujishima, A., Rao, T., Tryk, D. Journal of Photochemistry and Photobiology C: Photochemistry Reviews, vol. 1, p. 1-21, 2000.*
Jarrell, John D. (May 2008) Active metal oxides and polymer hybrids as biomaterials (Doctoral Dissertation). Retrieved from Proquest Dissertations and Theses Database. (UMI 3335664).*
Yabua Takeshi, Tsuru Kanji, Hayakawa Satoshi, Osaka Akiyoshi, "Synthesis of Blood Compatible PDMS-Based Organic-Inorganic Hybrid Coatings", Journal of Sol-Gel Science and Technology, 31, 273-276, Kluwer Academic Publishers, 2004.
Iketani Kazuya, Sun Ren-De, Toki Motoyuki, Hirota Ken, Yamaguchi Osamu, "Sol-gel-derived TiO2/poly (dimethylsiloxane) hybrid films and their photocatalytic activities", Journal of Physics and Chemistry of Solids, 64 (2003) 507-513, Elsevier Science Ltd.
Nakade Masato, Kameyama Koichi, Ogawa Makoto, "Synthesis and properties of titanium dioxide/polydimethylsiloxane hybrid particles", Journal of Material Science, 39 (2004) 4131-4137, Kluwer Academic Publishers 2004.
Anpo, Masakazu, "Preparation, Characterization, and Reactivities of Highly Functional Titanium Oxide-Based Photocatalysts Able to Operate under UV-Visible Light Irradiation: Approaches in Realizing High Efficiency in the Use of Visible Light", Bull. Chem. Soc. Jpn., 77, 1427-1442 (2004).

(Continued)

*Primary Examiner*—Harold Y Pyon
*Assistant Examiner*—Anthony H Sheh
(74) *Attorney, Agent, or Firm*—Barlow, Josephs & Holmes, Ltd.

(57) ABSTRACT

Novel compositions, as well as related methods, coatings, and articles, are disclosed.

12 Claims, 3 Drawing Sheets

OTHER PUBLICATIONS

Lin Yu-Ting, Zeng Tsung-Wei, Lai Wei-Zong, Chen Chun-Wei, Lin Yun-Yue, Chang Yu-Sheng, Su Wei-Fang, "Efficient photoinduced charge transfer in TiO2 nanorod/conjugated polymer hybrid materials", Nanotechnology 17 (2006) 5781-5785, Institute of Physics Publishing LTD, Printed in UK.

Kroon J.M., Veenstra S.C., Sloof L.H., Verhees W.J.H., Koetse M.M., Sweelssen J., Schoo H.F.M., Beek W.J.E., Wienk M.M., Janssen R.A.J., Yang X., Loos J., Michailetchi V.D., Blom P.W.M., Knol J., Hummelen J.C., "Polymer Based Photovoltaics: Novel Concepts, Materials and State-of-the-Art Efficiencies", Presented at the 20th European Photovoltaic Solar Energy Conference and exhibition, Barcelona, Spain, Jun. 6-10, 2005.

Tada Hiroaki, Mitsui Tomohiro, Kiyonaga Tomokazu, Akita Tomoki, Tanaka Koji, "All-Solid-State Z-scheme in CdS-Au-TiO2 three-component nanojunction system", Nature Publishing Group 5, 782-786. Oct. 2006.

Alonso Bruno, Maquet Jocelyne, Viana Bruno, Sanchez Clement, "Hybrid organic-inorganic polydimethylsiloxane-vanadium-oxo materials crosslinked at the molecular level", New J. Chem., 1998, pp. 935-939.

Jarrell John D.,"Metal Oxide Coated (MOC) Cell Culture Arrays for Rapid Biological Screening", Graduate Program in Biomedical Engineering, Brown University, Providence, RI, Aug. 15, 2006.

* cited by examiner

US 7,868,078 B2

COMPOSITION INCLUDING METAL OXIDE AND POLYMER

CROSS REFERENCE TO RELATED APPLICATION

This application is related to and claims priority from earlier filed provisional patent application Ser. No. 60/981,263, filed Oct. 19, 2007 and incorporated herein by reference.

TECHNICAL FIELD

This disclosure relates to novel compositions, as well as related methods, coatings, and articles.

BACKGROUND

Titanium oxide is a metal oxide semiconductor which, upon illumination with photon energy higher than its band gap, produces electrons and holes in the conduction band and valence band, respectively. These photo-generated electrons and holes can combine with surface adsorbed species (e.g., water and oxygen) to form highly reactive radical species such as hydroxyl radical ($^{\cdot}OH$) and superoxide anion ($O_2^{\cdot-}$). These reactive species have strong oxidizing power and can oxidize most organic compounds. As a result, the presence of these reactive species provides photocatalytic activities to the surface of the titanium oxide particles. Reactive species are typically produced only when titanium oxide is illuminated with UV light (e.g., having a wavelength less than 380 nm).

SUMMARY

This disclosure relates to novel compositions, as well as related methods, coatings, and articles.

In one aspect, this disclosure features methods that include applying a composition containing a polymer and a metal oxide precursor onto a surface of an object, and after applying the composition onto the surface of the object, forming a metal oxide from the metal oxide precursor.

In another aspect, this disclosure features methods that include forming a metal oxide from a metal oxide precursor in a composition containing a polymer and the metal oxide precursor by exposing the metal oxide precursor to a gas having a humidity level of about 40% to about 70% for at least about one hour.

In another aspect, this disclosure features methods that include forming a metal oxide from a metal oxide precursor in a composition containing a polymer and the metal oxide precursor by exposing the metal oxide precursor to a gas having a humidity level of about 40% to about 70% and contacting the metal oxide precursor with substantially no water, acid, or base other than water, acid, and base present in the gas.

In another aspect, this disclosure features articles prepared by the above methods.

In another aspect, this disclosure features compositions that includes a polymer and a metal oxide, in which the compositions have a maximum absorption peak at a wavelength of from about 380 nm to about 1,200 nm.

In another aspect, this disclosure features compositions that include a polymer and a metal oxide, in which the compositions reduce the optical density at 664 nm of a methylene blue solution by at least about 20% upon irradiation of the compositions with light having a wavelength from about 380 nm to about 1,200 nm for about one hour.

In still another aspect, this disclosure features articles that include an object and a coating supported by a surface of the object. The coating includes a polymer and a metal oxide precursor. The metal oxide precursor is about 50% to about 99% of the total volume of the metal oxide precursor and the polymer.

Embodiments can include one or more of the following features.

In some embodiments, forming the metal oxide from the metal oxide precursor includes hydrolyzing the metal oxide precursor.

In some embodiments, forming the metal oxide from the metal oxide precursor is carried out at a temperature not higher than about 45° C. (e.g., not higher than about 30° C.).

In some embodiments, forming the metal oxide from the metal oxide precursor is carried out for at least about one hour.

In some embodiments, forming the metal oxide from the metal oxide precursor includes exposing the composition to a gas having a humidity level of about 40% to about 70% and/or contacting the metal oxide precursor with substantially no water, acid, or base other than water, acid, and base present in the gas.

In some embodiments, the gas includes air.

In some embodiments, the metal oxide precursor includes a metal alkoxide, a metal diketonate, or a metal salt. For example, the metal oxide precursor can include a titanium alkoxide, a vanadium alkoxide, a zinc alkoxide, a zirconium alkoxide, a silver alkoxide, or a tantalum alkoxide.

In some embodiments, the metal oxide precursor includes titanium tetraisopropoxide or vanadium oxytripropoxide.

In some embodiments, the metal oxide includes a titanium oxide, a vanadium oxide, a zinc oxide, a zirconium oxide, a silver oxide, or a tantalum oxide.

In some embodiments, the polymer includes a polysiloxane, a polyurethane, a poly(ethylene oxide), a polyacrylamide, a polypeptide, a polysaccharide, or a combination or a copolymer thereof. For example, the polymer can include a poly(dimethylsiloxane), such as a functionalized poly(dimethylsiloxane). In certain embodiments, at least a portion of the functionalized poly(dimethylsiloxane) is cross-linked while forming the metal oxide from the metal oxide precursor.

In some embodiments, the metal oxide precursor is about 50% to about 99% (e.g., about 60% to about 97%) of the total volume of the metal oxide precursor and the polymer.

In some embodiments, the compositions can further include a solvent. In certain embodiments, the methods described above can further include removing the solvent after applying the composition onto the surface of the object or prior to forming the metal oxide from the metal oxide precursor.

In some embodiments, the compositions have a maximum absorption peak at a wavelength of from about 500 nm to about 1,100 nm (e.g., from about 600 nm to about 1,000 nm).

In some embodiments, the compositions are in the form of a coating on a surface of an object. In certain embodiments, the object is a medical device, such as a medical implant.

In some embodiments, the articles can be a medical device, such a medical implant.

Embodiments can include one or more of the following advantages.

In some embodiments, a coating described above unexpectedly exhibits photocatalytic activities upon irradiation of visible and infrared (IR) light (e.g., having a wavelength from about 380 nm to about 1,200 nm) and X-ray (e.g., having a wavelength from about 0.01 nm to about 10 nm) in addition to ultraviolet (UV) light (e.g., having a wavelength from about 10 nm to about 380 nm). In certain embodiments, a coating described above exhibits photocatalytic activities upon irradiation of light having a wavelength of about 600 nm to about 1,000 nm, an optimal range of wavelengths for light penetration of human bodies. As a result, such a coating can provide effective therapeutic treatment (e.g., anti-inflammatory or anti-microbial activities) to bone, skin, muscle, and other soft tissues when a medical device having the coating is implanted into human bodies. In certain embodiments, a coating described above exhibits photocatalytic activities upon irradiation of X-ray having a wavelength from about 0.01 nm to about 10 nm at a dosage that is not harmful to human bodies, such as a dosage used in a typical CT scanner. As a result, such a coating can provide effective therapeutic treatment (e.g., anti-inflammatory or anti-microbial activities) to bone, skin, muscle, and other soft tissues when a patient having a medical implant containing the coating is scanned by a typical CT scanner. In certain embodiments, a coating described above exhibits low photocatalytic activities upon UV light irradiation, but maintains high photocatalytic activities upon visible or IR light irradiation. As a result, such a coating can provide effective therapeutic treatment (e.g., anti-inflammatory or anti-microbial activities) when UV light irradiation is undesirable and is removed by filtration.

In some embodiments, a coating described above significantly improves the delivery profile of vanadium oxide from the coating. For example, when vanadium oxide is loaded into a coating that includes a titanium oxide and a poly(dimethylsiloxane), an unexpectedly high percentage of vanadium oxide is released from the coating under physiological conditions. The percentage of vanadium oxide released from the coating is, for example, much greater than the percentage of vanadium oxide released from coatings that contain titanium oxide without the poly(dimethylsiloxane). As a result, when such a coating is disposed (e.g., implanted into a human body), vanadium oxide can be delivered in the human body in amounts sufficient to achieve its therapeutic effects.

In some embodiments, a coating described above significantly improves the delivery profile of silver oxide from the coating. For example, when small amounts of silver oxide (from silver neodecanoate) is loaded into a coating that includes a titanium oxide and a poly(dimethylsiloxane), silver is released to provide higher than expected antimicrobial action from the coating under physiological conditions. For example, higher amounts of silver loading is required to provided antimicrobial activity with titanium oxide coatings compared to coatings containing a mixture of titanium oxide with the poly(dimethylsiloxane). This lower effective dose of silver enables the creation of coatings that prevent bacterial growth, while supporting the growth of human cells (e.g., fibroblasts). Higher silver oxide loading provides longer sustained antimicrobial capabilities to theses coatings. As a result, when such a coating is disposed (e.g., implanted into a human body), silver can be delivered in the human body in amounts sufficient to achieve antimicrobial therapeutic effects.

Other features and advantages will be apparent from the description, drawings and claims.

DESCRIPTION OF DRAWINGS

Like reference symbols in the various drawings indicate like elements.

DETAILED DESCRIPTION

Figure 1:
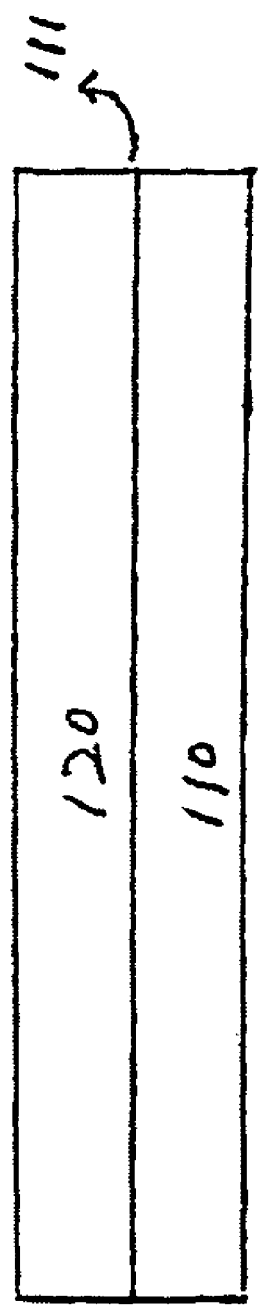
FIG. 1 is a cross-sectional view of an embodiment of a coated article.

FIG. 1 illustrates a cross-sectional view of a coated article 100 that includes an object 110 and a coating 120 supported on a surface 111 of object 110.

In general, coating 120 includes a metal oxide and a polymer.

The metal oxides that can be used in coating 120 generally include oxides that exhibit one or more therapeutic effects under a certain condition. In some embodiments, the metal oxide in coating 120 is a transition metal oxide. Examples of suitable metal oxides for use in coating 120 include titanium oxides, vanadium oxides, zinc oxides, zirconium oxides, silver oxides, tantalum oxides, or combinations thereof.

In some embodiments, coating 120 includes a titanium oxide. Without wishing to be bound by theory, it is believed that titanium oxide possesses photocatalytic activities upon irradiation with light of a certain wavelength, thereby resulting in a coating with anti-microbial and anti-inflammatory properties. For example, upon irradiation with UV light, titanium oxide can generate charges which produce reactive oxygen species (such as hydroxyl radicals and superoxide anion radicals) that can decompose organic matters (such as bacteria). Photon irradiation can generate positive and negative electrical charges which can catalyze chemical reactions to influence and stimulate biological and therapeutic activity (e.g., control inflammation, bacterial and cellular activity) and attract or repel adjacent charged bodies (e.g., bacteria, human cells, ions, proteins, peptides, growth factors). In some embodiments, when coating 120 includes a certain amount of a titanium oxide, it unexpectedly exhibits photocatalytic activities upon irradiation with visible and IR light (e.g., having a wavelength from about 380 nm to about 1,200 nm) and X-ray (e.g., having a wavelength from about 0.01 nm to about 10 nm, such as from about 0.06 nm to about 0.2 nm) in addition to UV light (e.g., having a wavelength from about 10 nm to about 380 nm).

In some embodiments, coating 120 includes a combination of a vanadium oxide and a titanium oxide. Vanadium oxide is a known insulin mimic and can be used to treat local and systemic diabetic conditions, ameliorate chronic diabetic, improve wound and soft tissue healing, and prevent cellular damage from ischemia. Without wishing to be bound by theory, it is believed that the presence of a polymer in coating 120 significantly improves the delivery profile of vanadium oxide from the coating. In some embodiments, for example, when vanadium oxide is loaded into coating 120 that includes a titanium oxide and a poly(dimethylsiloxane), a much higher percentage of vanadium oxide is unexpectedly released from coating 120 under physiological conditions than from a coating that contains the titanium oxide without the poly(dimethylsiloxane).

In some embodiments, coating 120 includes a combination of a silver oxide (e.g., derived from silver neodecanoate) and a titanium oxide. Silver is known to have antimicrobial properties, while titanium oxide is found to reduce the inflammatory response of contacting tissues compared to other implant materials (e.g., stainless steels and silver). Without wishing to be bound by theory, it is believed that the presence of a polymer in coating 120 significantly improves the delivery profile of silver oxide from the coating. In some embodiments, for example, when silver oxide is loaded into coating 120 that includes a titanium oxide and a poly(dimethylsiloxane), a higher antimicrobial activity is achieved with coating 120 under physiological conditions than from a coating that contains the titanium oxide without the poly(dimethylsiloxane). Unique combinations of titanium oxide and silver oxide in poly(dimethylsiloxane) unexpectedly support human cell growth, while preventing bacterial growth.

In some embodiments, the weight percentage of the metal oxide (e.g., a titanium oxide) in coating 120 can be at least about 0.11% (e.g., at least about 22%, at least about 30%, at least about 41%, at least about 91%, or at least about 99%).

The polymers that can be used in coating 120 generally include polymers that can facilitate formation of metal oxide-containing coatings on object 110. The term "polymer" mentioned herein refers to a compound having at least 2 (e.g., at least 3, at least 5, at least 10, at least 50, at least 100, at least 500, at least 1,000) monomer repeat units.

The polymers in coating 120 can either be inorganic polymers or organic polymers. Exemplary inorganic polymers include polysiloxanes or polysilanes. Exemplary organic polymers include poly(alkylene oxide)s (e.g., polyethylene oxides), polycarbonates, polyurethanes, polyacrylamides, polypeptides (e.g., collagens), or polysaccharides (e.g., agaroses or alginates).

In some embodiments, coating 120 includes a poly(dimethylsiloxane). In certain embodiments, the poly(dimethylsiloxane) can be a non-functionalized poly(dimethylsiloxane), i.e., without containing a reactive functional group. Reactive functional groups are well known in the art and include, but are not limited to, alkenyl, alkynyl, alkoxy, aryl, heteroaryl, hydroxyl, thiol, halo, cyano, nitro, amino, amide, imide, ester, ether, and carbonyl groups. An example of a commercially available non-functionalized poly(dimethylsiloxane) is DOW CORNING 200 FLUID 20 CST. In other embodiments, the poly(dimethylsiloxane) can be a functionalized poly(dimethylsiloxane) (i.e., containing at least one reactive functional group, such as an amino, hydroxyl, or alkoxy group). An example of a commercially available functionalized poly(dimethylsiloxane) is DOW CORNING MDX4-4159. Without wishing to be bound by theory, it is believed that including metal oxides (e.g., a titanium oxide, vanadium oxide and silver oxide) into a coating containing a polymer (e.g., a polysiloxane or a polyurethane) can result in improved bio-compatibility, cell proliferation, antimicrobial properties and photocatalytic activities comparing to a coating containing the polymer alone. Further, without wishing to be bound by theory, it is believed that including a polymer into a coating containing a metal oxide can result in improved adhesion and mechanical properties comparing to a coating containing the metal oxide alone.

In general, the polymer in coating 120 can be either a homopolymer or a copolymer (e.g., a block copolymer, a random copolymer, or an alternating copolymer). An example of a copolymer that can be used in coating 120 is poly(ethylene oxide)-co-poly(dimethylsiloxane), such as those described in (1) J. H. Park et al., *Biomaterials* 2002, 23:1797-1808, (2) J. H. Park et al., *J. Appl. Polym. Sci.*, 2003, 89:1505-1514, and (3) J. H. Park et al., *J. Biomed. Mater. Res.*, 2003, 64A:303-319, the entire contents of which are incorporated herein by reference. Without wishing to be bound by theory, it is believed that the presence of poly(ethylene oxide) facilitates formation of hydrogels, which retain water and help dissolution of water soluble biomaterials in the coating. Other exemplary copolymers include polycarbonate-co-polyurethanes, polyacrylic-co-polyurethanes, and polyether-co-polyurethanes.

In some embodiments, coating 120 includes a blend of two or more polymers, such as a blend of a polyurethane and a polysiloxane. In some embodiments, when the blend includes two polymers, the weight ratio of the two polymers can range from at least about 1:20 (e.g., at least about 1:15, at least about 1:10, at least about 1:5, at least about 1:2, at least about 1:1).

In some embodiments, coating 120 has a maximum absorption peak at a wavelength of from about 380 nm to about 1,200 nm (e.g., from about 500 nm to about 1,100 nm or from about 600 nm to about 1,000 nm). In some embodiments, coating 120 has a maximum absorption peak at a wavelength of from about 0.01 nm to about 10 nm (e.g., from about 0.03 nm to about 1 nm or from about 0.06 nm to about 0.2 nm).

In some embodiments, the materials in coating 120 are amorphous. Without wishing to be bound by theory, it is believed that, in such embodiments, coating 120 does not need to be heated to form crystalline materials to exhibit photocatalytic activities. Such a coating can be applied to heat sensitive objects, such as textiles, without heating while still maintaining its photocatalytic activities.

In some embodiments, coating 120 contains separated phases. In certain embodiments, the separated phases have an average diameter of at least about 10 nm (e.g., at least about 30 nm, at least about 50 nm, at least about 80 nm, or at least about 100 nm) and/or at most about 500 nm (e.g., at most about 400 nm, at most about 300 nm, at most about 200 nm, or at most about 100 nm). In some embodiments, the separated phases contain nano-sized domains. In certain embodiments, the nano-sized domains have an average length of at least about 0.5 nm (e.g., at least about 1 nm or at least about 5 nm) and/or at most about 10 nm (e.g., at most about 5 nm or at most about 1 nm). In certain embodiments, the nano-sized domains have an average width of at least about 0.1 nm (e.g., at least about 0.2 nm, at least about 0.5 nm, or at least about 1 nm) and/or at most about 2 nm (e.g., at most about 1 nm, at most about 0.5 nm, or at most about 0.2 nm).

In some embodiments, coating 120 can include other therapeutic agents. Examples of therapeutic agents include proteins, peptides, growth factors, vitamins, minerals, drugs, metal-organics, and metal salts. In some embodiments, such therapeutic agents can be released from coating 120 and delivered to a target site under physiological conditions (e.g., in a body fluid, such as blood).

Coating 120 can generally be prepared by a liquid-based coating process. The term "liquid-based coating process" mentioned herein refers to a process that uses a liquid-based coating composition. Examples of liquid-based coating compositions can include a solution, a dispersion, and a suspension. After the coating composition is applied to surface 111 of object 110, the composition is typically dried and then hydrolyzed in air to form coating 120.

In general, the liquid based coating composition can include a metal oxide precursor, a polymer, and a solvent.

The term "metal oxide precursor" mentioned herein refers to any compounds that can form a metal oxide. In some embodiments, the metal oxide precursor is a metal alkoxide. Exemplary metal alkoxides include titanium alkoxides (e.g., titanium tetraisopropoxide), vanadium alkoxides (e.g., vanadium oxytripropoxide), zinc alkoxides, zirconium alkoxides, silver alkoxides, or tantalum alkoxides. In some embodiments, the metal oxide precursor is a metal diketonate (e.g., titanium bis(ethyl acetoacetato)diisopropoxide) or a metal salt (e.g., titanium tetrachloride or silver chloride).

In general, the polymer in the coating composition can be the same as or different from the polymer in coating 120. In some embodiments, when the polymer molecule does not contain any functional group, the polymer in coating 120 is generally the same as the polymer in the coating composition. In some embodiments, when the polymer molecule contains a functional group (e.g., amino, alkoxy, or hydroxyl groups), the polymer molecule can react with another polymer molecule or a metal oxide precursor molecule during the drying and hydrolyzing steps to form a polymer molecule with higher molecular weight or a polymer molecule covalently attached to a metal oxide molecule. In some embodiments, when the polymer molecule contains two or more functional groups, cross-linked polymer molecules can be formed in addition to the species formed above.

The volume ratio of the metal oxide precursor and the polymer can vary as desired. When the metal oxide precursor is a titanium oxide precursor and the polymer is poly(dimethylsiloxane), the coating compositions can be typically divided into four different classes depending on their physical and biological properties.

In the first class, the coating composition contains a titanium oxide precursor that is about 0.4% (i.e., corresponding to about 0.11 wt % of titanium oxide in the coating) to about 50% (i.e., corresponding to about 22 wt % of titanium oxide in the coating) of the total volume of the titanium oxide precursor and poly(dimethylsiloxane). Coatings formed from this class of compositions exhibit improved fibroblast cell attachment and proliferation, and reduced soft tissue inflammation upon contacting the coatings with living tissues. In addition, when vanadium oxide is loaded into such coatings, a much higher percentage of vanadium oxide can be eluted from the coatings than from coatings containing titanium oxide without poly(dimethylsiloxane) under the same elution conditions. Coatings formed from this class of compositions generally exhibit similar photocatalytic activities (e.g., as measured by a methylene blue assay described in Example 5 or 6 below) to those of coatings containing titanium oxide without poly(dimethylsiloxane).

In the second class, the coating composition contains a titanium oxide precursor that is about 50% to about 97.5% (i.e., corresponding to about 91 wt % of titanium oxide in the coating) of the total volume of the titanium oxide precursor and poly(dimethylsiloxane). In addition to improved biological properties of the coatings formed from the first class of compositions, coatings formed from this class of compositions unexpectedly exhibit photocatalytic activities (e.g., as measured by a methylene blue assay described in Example 5 or 6 below) upon irradiation of a broad spectrum of light, such as X-ray (e.g., at from about 0.06 to about 0.2 nm), UV light (e.g., at about 388 nm), visible light (e.g., at about 420 nm, about 540 nm, or about 600 nm), and IR light (e.g., at about 720 nm or about 1,000 nm). In particular, coatings formed from compositions containing a titanium oxide precursor that is about 60% (i.e., corresponding to about 30 wt % of titanium oxide in the coating) to about 97.5% of the total volume of the titanium oxide precursor and poly(dimethylsiloxane) exhibit photocatalytic activities upon irradiation with light having a wavelength of about 600 nm to about 1,000 nm, an optimal range of wavelengths for light penetration of human bodies. As a result, such a coating can provide effective therapeutic treatment (e.g., anti-inflammatory or anti-microbial activities) to bone, skin, muscle, and other soft tissues when a medical device having the coating is implanted into human bodies. Such coatings can provide effective therapeutic treatment when UV light irradiation is undesirable and is removed by filtration. By contrast, coatings formed from titanium oxide without poly(dimethylsiloxane) exhibit photocatalytic activities only upon irradiation of UV light (e.g., having a wavelength of less than about 380 nm). In addition, coatings formed from compositions containing a titanium oxide precursor that is about 71% (i.e., corresponding to about 41 wt % of titanium oxide in the coating) to about 97.5% of the total volume of the titanium oxide precursor and poly(dimethylsiloxane) exhibit much higher photocatalytic activities upon irradiation with light having a wavelength of about 600 nm to about 1,000 nm than UV light, and therefore are particularly useful for this purpose.

In the third class, the coating composition contains a titanium oxide precursor that is about 97.5% to about 99.7% (i.e., corresponding to about 99 wt % of titanium oxide in the coating) of the total volume of the titanium oxide precursor and poly(dimethylsiloxane). Coatings formed from this class of compositions exhibit improved cell proliferation and attachment properties similar to those of the coatings formed from the second class of compositions, but exhibit reduced photocatalytic activities. In particular, reduction in photocatalytic activities upon UV light irradiation is faster than reduction in photocatalytic activities upon visible or IR light irradiation. As a result, the coating formed from this class of compositions exhibit lower photocatalytic activities upon UV light irradiation than upon visible or IR light irradiation.

In the fourth class, the coating composition contains a titanium oxide precursor that is about 99.7% to about 99.9% (i.e., corresponding to about 99.6 wt % of titanium oxide in the coating) of the total volume of the titanium oxide precursor and poly(dimethylsiloxane). Similar to coatings formed from the first class of compositions, coatings formed from this class of compositions exhibit improved fibroblast cell attachment and proliferation, and reduced soft tissue inflammation upon contacting the coatings with living tissues, but exhibit similar photocatalytic activities to those of coatings containing titanium oxide without poly(dimethylsiloxane).

The solvents that can be used in the coating composition can generally be any solvents that can dissolve or disperse the polymer and the metal oxide precursor. In some embodiments, the solvent in the coating composition is an organic solvent. In some embodiments, the solvent has a low boiling point (e.g., at most about 150° C., at most about 120° C., at most about 100° C., or at most about 80° C.). Without wishing to be bound by theory, it is believed that using a solvent with a low boiling point facilitates solvent removal during the drying step and facilitates formation of coating 120. Exemplary solvents include alcohols (e.g., isopropanol) and aliphatic hydrocarbons (e.g., hexane or mineral spirit). In some embodiments, the solvent in the coating composition includes a mixture of two or more solvents.

In general, coating 120 can be prepared by a liquid-based coating process that typically includes the following steps: (1) mixing the metal oxide precursor and the polymer in a solvent to form a coating composition (e.g., a solution or a dispersion); (2) coating the composition on a surface of an object; (3) drying the coated composition; and (4) forming a metal oxide from the metal oxide precursor (e.g., by hydrolyzing the metal oxide precursor).

In some embodiments, the mixing step can be carried out by adding the metal oxide precursor and the polymer directly to a solvent to form a coating composition. In some embodiments, the mixing step can also be carried out by dissolving or dispersing a metal oxide precursor in a solvent to form a first composition, dissolving or dispersing a polymer in a solvent to form a second composition, mixing the first and second compositions to form the coating composition. In the mixing step, the coating composition is typically not treated with water, acid (i.e., inorganic or organic acids), or base (i.e., inorganic or organic bases) to hydrolyze the metal oxide precursor. Thus, prior to applying the coating composition on a surface of an object, substantially all (e.g., at least about 80 wt %, at least about 90 wt %, at least about 95 wt %, at least about 98 wt %, or at least about 99 wt %) of the metal oxide precursor in the coating composition is in the form of a precursor and is not hydrolyzed to form a metal oxide.

The coating step can generally be carried out by any suitable coating methods. In some embodiments, it is carried out by using at least one of the following processes: solution coating, ink jet printing, spin coating, dip coating, knife coating, bar coating, spray coating, roller coating, slot coating, gravure coating, flexographic printing, or screen printing. In certain examples, the coating composition is coated onto an object via dip coating by immersing the object in the coating composition and then withdrawing the object from the composition.

In general, after the composition is coated on a surface of an object, the solvent in the composition is removed by drying the composition. In some embodiments, the drying step is carried out at a temperature less than about 45° C. (e.g., less than about 40° C., less than about 35° C., or less than about 30° C.). In some embodiments, the drying step is carried out at room temperature, such as from about 24° C. to about 26° C. In some embodiments, the drying step is carried out at physiological temperature, such as from about 35° C. to about 40° C. In certain embodiments, the drying step is carried out during contact with biological tissues, such as the epidermis, dermis, cartilage and bone. In certain embodiments, the drying step is carried out at an elevated temperature (e.g., from about 30° C. to about 100° C.) to ensure removal of the residue solvent and/or to disinfect the coated object.

A metal oxide is typically formed from the metal oxide precursor by hydrolyzing the metal oxide precursor. The hydrolyzing step can generally be carried out by exposing the coated composition to a moisture-containing gas (e.g., air) so that the metal oxide precursor contacts with the moisture in the gas to form a metal oxide. Typically, the coated composition is not treated with water, acid (i.e., inorganic or organic acids), or base (i.e., inorganic or organic bases) in addition to that present in the gas to hydrolyze the metal oxide precursor. In some embodiments, the gas has a humidity level of from about 40% to about 70% (e.g., from about 50% to about 60%).

In some embodiments, the hydrolyzing step is carried out under the same conditions as the drying step. In embodiments where the drying step is carried out at room temperature, at least a portion of the hydrolyzing step occurs simultaneously with the drying step. In embodiments where the drying step is carried out at an elevated temperature, substantially the entire hydrolyzing step occurs after the drying step (i.e., after the solvent is removed).

In some embodiments, the hydrolyzing step can be carried out for at least about 1 hour (e.g., at least about 2 hours, at least about 4 hours, at least about 8 hours, at least about 12 hours, at least about 24 hours).

In some embodiments, coating 120 is heated at an elevated temperature (e.g., from about 90° C. to about 400° C., such as 250° C.) after the hydrolyzing step. The heating can be carried out by any suitable methods, such as placing coating 120 on a hot plate, in a furnace or in a high temperature steam in an autoclave. Without wishing to be bound by theory, it is believed that the heating (e.g., by a high temperature steam) can disinfect the coating. Without wishing to be bound by theory, it is believed that heating (e.g., in a furnace at about 400° C.) can reduce the organic component of the polymer and change the surface morphology of the coating (e.g., from smooth to reticular and porous), which can improve the reaction of biological tissues to the coatings (e.g., improve tissue ingrowth, cellular growth and attachment).

Turning to other components of article 100, object 110 can generally be made of any suitable material. Examples of materials suitable for preparing object 110 include metals (e.g., metal alloys), glasses, ceramics, polymers (e.g., plastics or elastomers), composite materials, gels (e.g., hydrogels), proteins (e.g., collagens), and polysaccharides (e.g., agaroses or alginates). While shown in FIG. 1 as having a rectangular shape, object 110 can generally have any desired shape (e.g., square, circle, semicircle, triangle, diamond, ellipse, trapezoid, irregular shape). In some embodiments, different regions of object 110 can have different shapes.

In some embodiments, article 100 can be a medical device. In such embodiments, coating 120 can provide photon activated disinfection and controlled delivery of bioactive compounds (e.g., silver and vanadium oxide) to the medical device. Examples of the medical devices include medical implants, wound dressings or bandages, wound closure devices, blades, needles, forceps, drills, bone cutters, and operating room equipment. Exemplary medical implants include transepithelial implants, dental implants, facial reconstruction implants, cosmetic/plastic surgery implants, subcutaneous implants, percutaneous implants, bone implants (e.g., bone screws, plates, or external fixation devices), artificial joints (e.g., knee joints, hip joints, or ankle joints), catheters (e.g., peritoneal catheters, or tracheal and gastric ports or catheters), abutments (e.g., abutments for transdermal devices, prosthetic attachment abutments, or bone anchored abutments), blood contact devices (e.g., vascular graphs, small diameter vascular devices, heart valve components, pacemaker housings and electrodes, PORT-A-CATH devices, totally implantable venous access system devices, or heparin locks), intramedullary devices (e.g., intramedullary rods or osseointegrated prosthetic attachments), and engineered tissues (e.g., tissue scaffolds, bone scaffolds, artificial skin or dermas scaffolds, in-situ formed foam scaffolds, collagen scaffolds, or resorbable scaffolds). Exemplary wound dressings or bandages include chronic or diabetic ulcer and wound dressings, burn coverings, therapeutic lotions or gels, and wound treatment. Exemplary wound closure devices include sutures (e.g., resorbable sutures) and staples.

Figure 2:
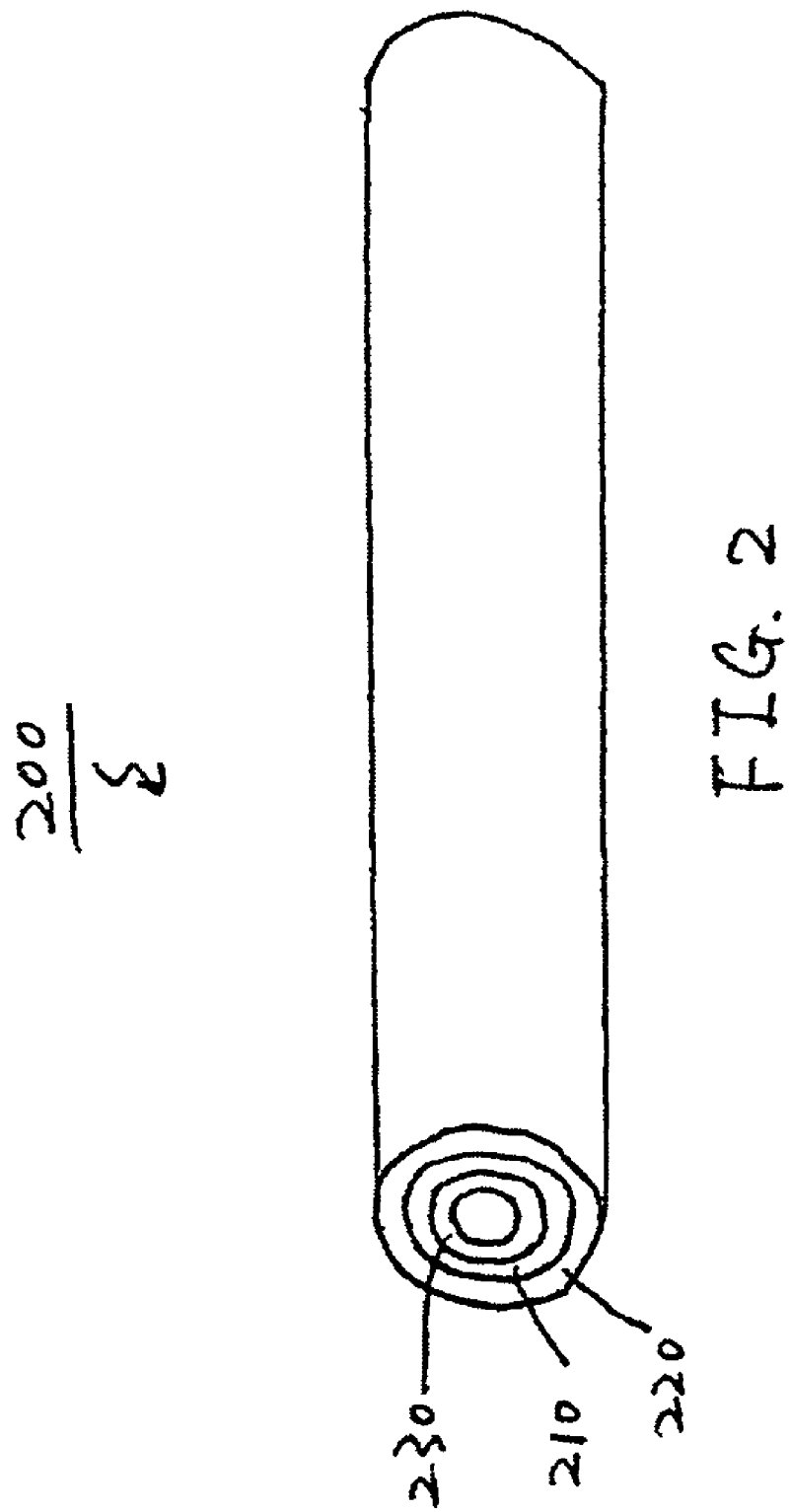
FIG. 2 is a cross-sectional view of an embodiment of a coated catheter.

An example of a medical device having one or more coatings described above is a coated catheter. Specifically, as shown in FIG. 2, catheter 200 includes a catheter body 210, a coating 220 supported by the outer surface of catheter body 210, and a coating 230 supported by the inner surface of catheter body 210. In some embodiments, both coatings 220 and 230 can include a metal oxide (e.g., a titanium oxide) and a polymer. In some embodiments, coatings 220 and 230 can have different compositions (e.g., different metal oxides and/or different polymers).

In some embodiments, coatings 220 and 230 can provide therapeutic effects (e.g., anti-inflammatory and/or anti-microbial activities) to catheter 200. For example, when coating 220 or 230 is prepared from a composition containing a titanium oxide precursor and a poly(dimethylsiloxane), in which the titanium oxide precursor is about 50% to about 97.5% of the total volume of the two components, it can provide anti-inflammatory properties to catheter 200 when catheter 200 is implanted within human bodies and provide anti-microbial properties by generating reactive oxygen species upon irradiation of near IR or IR light (such as light having a wavelength of 820 nm or 920 nm, which can readily penetrate human bodies). In such embodiments, for example, the implanted catheter 200 can be exposed to near IR or IR light routinely (e.g., weekly or monthly) to inhibit the development of bacteria on and around catheter 200. Consequently, catheter 200 is particularly advantageous for applications that require long implant terms.

In some embodiments, the articles described above can be textiles, breathing or filtering masks, filters (e.g., air filters, water filters, or their components), or building structures (e.g., interior or exterior room or building surfaces). In some embodiments, the articles described above can be broad spectrum transmittance filters, optical filters, components for devices that convert light energy to electricity energy (e.g., components in a solar cell), or components for devices for generating hydrogen (e.g., components in a solar hydrogen generator).

While certain embodiments have been disclosed, other embodiments are also possible.

While compositions containing a polymer and a metal oxide in the form of a coating have been described above, in some embodiments, the compositions can be in another form. In some embodiments, such a composition can be uniformly dispersed in an article (e.g., a gel or an oil). For example, the composition can be incorporated into a lotion or a gel that can be applied directly to skin or wounds or incorporated into a solution or dispersion that can be used as a disinfection spray. As another example, the composition can be incorporated into a carrier for drug delivery (e.g., topical drug delivery). In some embodiments, an entire article can be formed of one or more of the metal oxide and polymer compositions described herein by methods such as molding or casting.

In some embodiments, coating 120 exhibits photocatalytic activities upon irradiation with an ionization radiation source other than UV, visible, and IR light. Examples of other ionization radiation sources include X-ray sources, such as medial X-ray or CT scanners. In certain embodiments, coating 120 can exhibit photocatalytic activities upon irradiation with a pulsed magnetic field (e.g., from a medical MRI scanner).

The following examples are illustrative and are not intended to be limiting.

Example 1

Preparation of titanium oxide-Containing Coatings

Metal alkoxides used in the follow procedures were obtained from Sigma-Aldrich Chemical Company, Allentown, Pa.

A stock solution of titanium tetraisopropoxide was prepared by dispersing 1 ml of titanium tetraisopropoxide in 10 ml of isopropanol. A stock solution of titanium tetra(n-butoxide) was prepared in a similar manner. A polymer stock solution was prepared by adding 1 ml of poly(dimethylsiloxane) (PDMS) (DOW CORNING MDX4-4159, 50% medical grade dispersion, Dow Corning Corporation, Midland, Mich.) into 10 ml of 70% hexanes/30% isopropanol (vol/vol) and by briefly shaking the mixture at room temperature. All stock solutions were allowed to age 15 minutes at room temperature and were briefly shaken before they were used to form coating compositions containing a titanium oxide precursor and PDMS in different volume ratios.

To measure the elution profile of vanadium oxide, a stock solution containing vanadium oxide was prepared by adding 0.2 ml of vanadium oxytripropoxide to the above titanium tetraisopropoxide stock solution. This stock solution was used to prepare, via serial dilutions, eight solutions with vanadium oxytripropoxide concentrations ranging from 20% to 0.156% of the volume of titanium tetraisopropoxide. To prepare a coating composition, an equal volume of a mixed metal oxide precursor stock solution was added to the polymer stock solution. This resulted in a composition containing titanium tetraisopropoxide, vanadium oxytripropoxide, and PDMS, in which titanium tetraisopropoxide was 66% of the total volume of titanium tetraisopropoxide and PDMS.

For cell proliferation and attachment assays and methylene blue assays, coatings formed on the bottom of 96-well microplates were prepared using the following procedures: Polystyrene 96-well tissue culture microplates (Corning Costar, Corning Incorporated, Life Sciences, Lowell, Mass.) were placed under a fume hood. Using an eight-channel pipette, 25 µl of a coating solution was added into each well of a microplate column. The plate was then inverted and briefly shaken before applying a coating solution to the next column of wells. Each column was coated with solutions of different compositions. Titanium oxide xerogel and non-coated cell culture-treated polystyrene were used as controls in each microplate. The microplates were then air-dried, face up and without lids, in a chemical hood for 12 to 24 hours. They were subsequently heat treated in air on a hot plate (Dataplate, Barnstead/Thermolyte, Dubuque, Iowa) at 95° C. for one hour with the lids in place.

For the short term elution assays, coatings on 12-well microplates were prepared by using a total of 50 µl/well of metal oxides solutions or 100 µl/well of solutions containing both metal oxides and PDMS. This resulted in the same total amount of vanadium oxide loading between coatings containing metal oxides alone and coatings containing both metal oxides and PDMS. Four replicate wells were coated with solutions containing 20, 10, 5, 1.25 and 0 vol % of vanadium oxytripropoxide in titanium tetra(n-butoxide), titanium tetraisopropoxide, and 66% titanium tetraisopropoxide-PDMS. The solutions were dispensed in two or four 25 µl doses per well with one minute of air-drying between doses. The microplates were air-dried, face up and without lids, in a chemical hood for 12 to 24 hours. Subsequently, they were heat treated in air on a hot plate at 95° C. for one hour with the lids in place.

Example 2

Cell Proliferation and Cell Viability Assays

Human dermal fibroblasts were derived from neonatal foreskins and were obtained from the Women & Infants Hospital of Rhode Island, Providence, R.I., USA (approved by the Institutional Review Board and in compliance with Declaration of Helsinki Guidelines). Foreskins were trimmed with scissors to remove excess fatty tissue, rinsed repeatedly with sterile phosphate buffered saline (PBS) (Invitrogen Corporation, Carlsbad, Calif.), and diced into small fragments. The fragments were allowed to adhere to the bottom of a tissue culture plate in a humidified 10% $CO_2$ atmosphere, at 37° C. for 1 hour, and were covered with Dulbecco's Modified Eagle Medium (DMEM) (Invitrogen Corporation, Carlsbad, Calif.) supplemented with 20% fetal bovine serum containing 100 U of penicillin and 100 µg/ml of streptomycin. Over a period of 14 days, fibroblasts migrated from the tissue fragments and formed a confluent layer on the culture plate. Fibroblasts were harvested with a 0.05% trypsin/0.53 mM EDTA solution and subcultured to near confluence in Human Fibroblast Medium (HFM) consisting of DMEM containing high glucose, L-glutamine, pyruvate and pyridoxine hydrochloride (Invitrogen Corporation, Carlsbad, Calif.) with additions of 10% fetal bovine serum and 1% penicillin-streptomycin. Cells were detached using 0.05% trypsin/0.53 mM EDTA for 3 minutes and re-suspended in serum containing medium. The cells were then seeded onto 96 well microplates at a density of 5,000 cells per well in 100 µl of HFM.

To measure cell proliferation, the microplates were first incubated at 37° C. with 10% $CO_2$ for 48 hours. After 10 µl of WST-1 (Roche Applied Science, Indianapolis, Ind.) was added into each well, the microplates were incubated for 3 additional hours at 37° C. The cell proliferation was quantified by measuring absorbance at about 440 nm using a microplate reader (SPECTRAMAX PLUS 384 Microplate Spectrometer with SOFTMAX PRO software, Molecular Devices Corporation, Sunnyvale, Calif.) and plotted. Five replicates with three cell-free controls were used for each coating type and the polystyrene plate bottom. Plates were also inspected under optical microscopy for cell spreading and morphology. Calibration curves were previously established for cell number versus optical density on polystyrene. Seeding density for the cell type was chosen within the linear portion of the calibration curve.

Coatings prepared from the following compositions were tested in the above cell proliferation assay: (1) compositions containing titanium tetraisopropoxide and PDMS in which titanium tetraisopropoxide was 0%, 6.06%, 11.76%, 22.22%, 40%, 66%, and 100% of the total volume of titanium tetraisopropoxide and PDMS, (2) compositions containing vanadium oxytripropoxide and PDMS in which vanadium oxytripropoxide was 0%, 3.07%, 6.06%, 11.76%, 22.22%, 40%, 66%, and 100% of the total volume of vanadium oxytripropoxide and PDMS, and (3) compositions containing vanadium oxytripropoxide, titanium tetraisopropoxide, and PDMS, in which vanadium oxytripropoxide was 0%, 0.15%, 0.31%, 0.62%, 1.25%, 2.5%, 5%, 10%, and 20% of the total volume of vanadium oxytripropoxide and titanium tetraisopropoxide, and PDMS is 33% of the total volume of the three components. The results showed that coatings prepared from all of compositions (1) exhibited improved cell proliferation comparing to a coating containing PDMS only and that coatings prepared from compositions in which titanium tetraisopropoxide was 11.76%, 22.22%, 40%, and 66% of the total volume of titanium tetraisopropoxide and PDMS exhibited improved cell proliferation comparing to a coating containing titanium oxide only. The results also showed that, except coatings prepared from compositions in which vanadium oxytripropoxide was 22.22%, 40%, and 66% of the total volume of vanadium oxytripropoxide and PDMS, coatings prepared from all of the other compositions (2) exhibited improved cell proliferation comparing to a coating containing PDMS only, and similar or slightly improved cell proliferation comparing to a coating containing titanium oxide only. Finally, the results showed that coatings prepared from all of compositions (3) exhibited improved cell proliferation comparing a coating containing PDMS only, and similar or slightly improved cell proliferation comparing to a coating containing titanium oxide only except those in which vanadium oxytripropoxide was 5%, 10%, and 20% of the total volume of vanadium oxytripropoxide and titanium tetraisopropoxide.

Example 3

Combined Cell Attachment and Cell Adhesion Assay

To characterize initial cell attachment (seeding efficiency) and cell adhesion, a modification of a previous reported method (see, e.g., A. J. Garcia, J. Biomed. Mater. Res. 2003, 67A(1):328-333) was used. Normal human fibroblasts were grown in a HFM solution in 500 $cm^2$ triple flasks to near-confluence. The cells were rinsed with complete PBS and incubated in 45 ml of 1 µg/ml calcein-AM in complete PBS with 2 mM dextrose for 30 minutes at 37° C. The cells were detached using 0.05% trypsin and 0.53 mM EDTA for 3 minutes and re-suspended in a serum-containing medium. The cells were subsequently centrifuged at 500 rpm for 5 minutes and re-suspended in PBS dextrose, centrifuged again, and re-suspended in PBS dextrose. The cells were then seeded onto coated microplates at a density of 10,000 cells per well and allowed to attach to the coating for one hour at 22° C. Calibration curves were previously established for cell number versus fluorescence on polystyrene and used to select a seeding density within the linear portion of the calibration curve and to maximize the signal to noise response of the plate reader.

The numbers of cells adhered to the coated wells were determined as follows using the microplates obtained above: Each well was completely filled with PBS-dextrose and the fluorescence baseline was recorded (using 485 nm excitation and 535 nm emission). The wells were emptied by inversion to remove floating cells and refilled with PBS-dextrose and the fluorescence baseline was recorded again. The microplate was covered with sealing tape (Corning Costar) and centrifuged upside down in a Centra-GP8R Refrigerated Centrifuge (Thermo Electron Corporation, Waltham, Mass.) using microplate buckets at 800 rpm for 5 minutes. The microplate was again inverted to empty and refilled with PBS-dextrose and the fluorescence was recorded a third time. The first and second fluorescence readings were compared to determine the fraction of cells that attached to the microplate 1 hour after seeding. This corresponds to the one hour cell seeding efficiency. The post-centrifuge fluorescence (third) reading was compared to the pre-centrifuge (second) reading to determine the fraction of attached cells that remained adherent after exposure to normal forces from centrifugation.

The above assays can be used to identify how readily cells attach to a surface (seeding efficiency) and quantify the strength of adhesion (adherent fraction). The centrifugal rate was selected to remove approximately 50% of the cells from the tissue culture-treated polystyrene well. Five replicates with three cell-free controls were used for each coating type and the polystyrene microplate bottom.

Coatings prepared from compositions containing various volume ratios of titanium tetraisopropoxide and PDMS and compositions containing various volume ratios of titanium tetraisopropoxide and a polyurethane were tested in the above cell adhesion assay. The results showed that coatings prepared from all compositions containing titanium tetraisopropoxide and a polymer (i.e., PDMS or a polyurethane) exhibited similar or improved cell adhesion comparing to a coating containing the polymer only, but less cell adhesion comparing to a coating containing titanium oxide only.

Example 4

Short-Term vanadium oxide Release Assay

To characterize the short-term delivery of vanadium oxide from titanium oxide xerogel matrices, coated 12-well plates were prepared in the same manner as described in Example 1 above. The plates were filled with 1 ml of PBS per well, covered with one or two layers of sealing tape (Corning Costar), and placed in a heated orbital shaker (ThermoForma Model 420, Thermo Electron Corporation, Marrietta, Ohio) set at 90 rpm and 37° C. At 0.25, 1.3, 4, 7, 14 and 28 days, the PBS was removed from each well and added to separate 15 ml centrifuge vials and refilled with fresh PBS. To each vial was added 10 ml of triple deionized water to allow for ICP elemental analysis for vanadium and titanium. Four replicates of each coating were used. Pure titanium oxide-coated and non-coated polystyrene wells were used for controls. The results for vanadium oxide elution were reported as mg/L and converted to percentage of total initial vanadium oxide in coatings and micrograms of vanadium oxide released based on the surface area of the coating. After the elution assay, the surfaces were inspected using SEM in conjunction with energy dispersive spectroscopy (EDS).

Coatings prepared from the compositions described in Example 1 were tested. The results showed that coatings prepared from compositions containing 20, 10, 5, and 1.25 vol % of vanadium oxytripropoxide exhibited a significantly higher vanadium oxide elution in terms of the percentage of total vanadium oxide in coating and the total amount of vanadium oxide released based on the surface area of the coatings.

Example 5

Methylene Blue Microplate Assay

To measure the room temperature color clearance of methylene blue (MB) by coatings containing titanium oxide and PDMS, a rapid screening assay was developed using coated 96-well microplates and an optical microplate reader. Methylene blue is a commonly used photocatalytic indicator, whose color is cleared by either redox reactions or mineralization during photocatalysis. A MB stock solution was prepared by using 3 mg of MB per 100 ml of deionized water and was stored in a foil wrapped bottle. A micropipette was used to dispense 20 µl of the MB stock solution and 180 µl of deionized water into each well of one microplate column, resulting in a solution having an optical density (OD) of approximately 0.5 at 664 nm wavelength. With the microplate lid removed, the absorbance of the MB solution at 664 nm was pre-read using an optical plate reader (SPECTRAMAX PLUS 384 Microplate Spectrometer with SOFTMAX PRO software, Molecular Devices Corporation, Sunnyvale, Calif.). The wells were subsequently exposed to 161 monochromatic flashes of a selected wavelength (5 second intervals between flashes) using the same plate reader in a dynamic mode. At the end of the dynamic photo-irradiation, a second absorbance reading was taken at 664 nm to quantify the monochromatic catalytic clearance of the MB solution.

Coating compositions containing different weight ratios of titanium oxide and PDMS were irradiated at 388 nm, 420 nm, 540 nm, 720 nm, and 1,000 nm. Three to four replicates were run for each coating. Changes in OD at 664 nm wavelength as a function of irradiation wavelengths and coating compositions were measured and summarized in FIG. 3.

Figure 3:
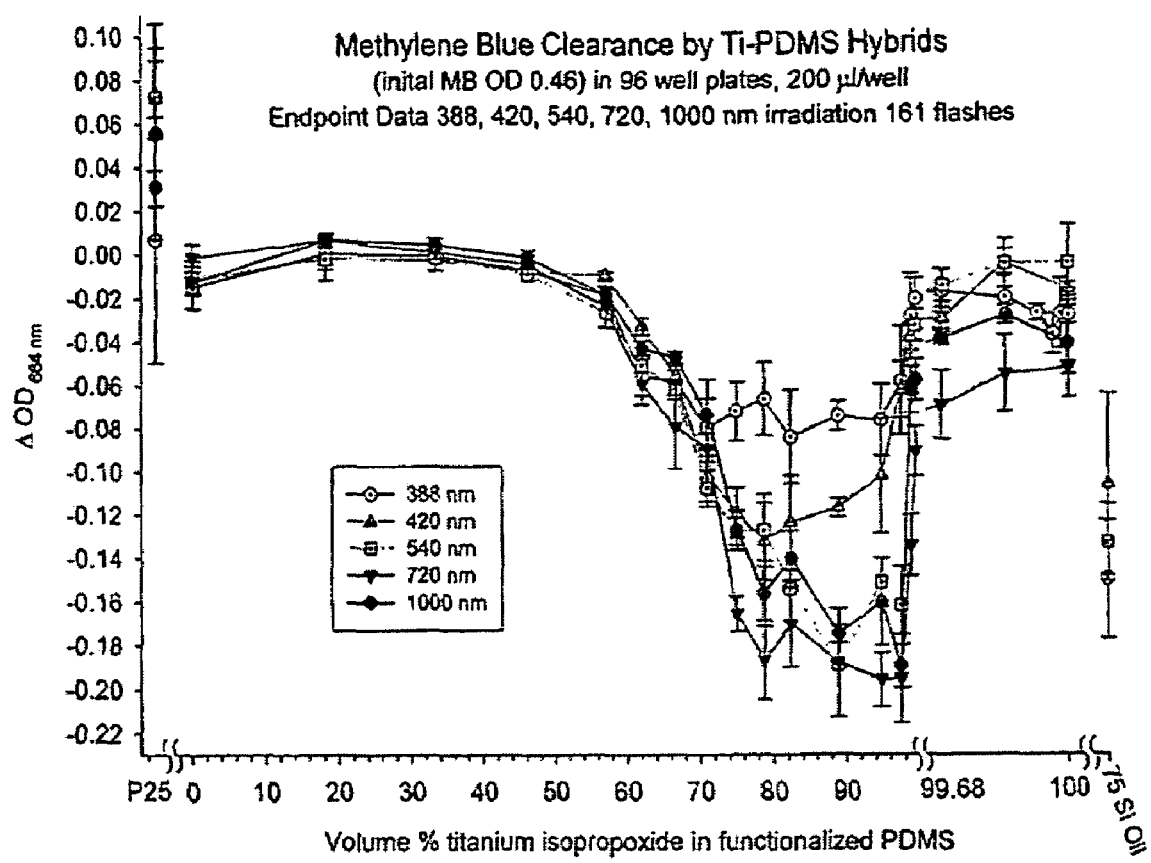
FIG. 3 is a scheme showing the results obtained from the assay described in Example 5.

As shown in FIG. 3, at all 5 wavelengths, ODs of the MB solutions remained substantially unchanged when they contacted coatings prepared from compositions containing titanium tetraisopropoxide below about 50% of the total volume of titanium tetraisopropoxide and PDMS, indicating that such coatings did not exhibit significant photocatalytic activities under these wavelengths. FIG. 3 also shows that, at all 5 wavelengths, ODs of the MB solutions decreased significantly when they contacted coatings prepared from titanium tetraisopropoxide that was about 60% to about 97.5% of the total volume of titanium tetraisopropoxide and PDMS, while the OD decreases peaked when the MB solution contacted coatings prepared from titanium tetraisopropoxide that was about 70% to about 95% of the total volume of titanium tetraisopropoxide and PDMS. The maximum OD decreases were achieved upon irradiation at 720 nm. In other words, these coatings exhibited strong photocatalytic activities upon irradiation at the above 5 wavelengths and maximum photocatalytic activities upon irradiation at 720 nm. These results showed unexpected advantages of these coatings compared to coatings containing titanium oxide without PDMS, which typically exhibited photocatalytic activities only upon UV irradiation (at a wavelength below 380 nm). Further, FIG. 3 shows that, at all 5 wavelengths, the decrease in ODs of the MB solutions dropped significantly when they contacted coatings prepared from titanium tetraisopropoxide that was about 97.5% to about 99.7% of the total volume of titanium tetraisopropoxide and PDMS, while the decrease in ODs dropped more rapidly when irradiated at 388 nm than irradiated at other wavelengths. In other words, the results showed reduction in photocatalytic activities among these coatings and the reduction is faster upon UV light irradiation than upon visible or IR light irradiation. As a result, these coatings exhibited lower photocatalytic activities upon UV light irradiation than upon visible or IR light irradiation. Finally, FIG. 3 shows that the ODs of the MB solution remain substantially unchanged when contacted with coatings prepared from compositions containing titanium tetraisopropoxide that was above about 99.7% of the total volume of titanium tetraisopropoxide and PDMS except that when irradiated with 720 nm light, the MB solutions still exhibited a low level of OD reduction. These results indicated that these coatings exhibited substantially no photocatalytic activities except when irradiated with 720 nm light.

Example 6

Methylene Blue Scintillation Vial Assay

To confirm the results of the MB microplate assay shown in Example 5, a comparative photocatalytic assay was developed as follows: 20 ml scintillation vials were coated with 300 µl of (1) a coating composition containing titanium tetraisopropoxide that was about 75% of the total volume of titanium tetraisopropoxide and PDMS and (2) an equal atomic titanium concentration of Degussa titanium dioxide P25 (Degussa Corporation, Ridgefield, N.J.) suspended in isopropanol. Vials were allowed to air dry at room temperature overnight. 10 ml of a MB stock solution and 10 ml of deionized water were dispensed into each of two similarly coated scintillation vials along with a small magnetic stir bar and placed on a stir plate set to 350 rpm (Dataplate, Bamstead/Thermolyte, Dubuque, Iowa). One vial was covered with a beaker wrapped in aluminum foil to serve as a light-free control. The second vial was irradiated with a broad spectrum UV and visible light using a Fostec high intensity visible light source, with 150 W 21V Halogen bulb and double gooseneck fiber optics. The tip of each fiber optical line was placed in direct contact with opposite sides of the vial to ensure that full power was applied. A 100 µl MB sample was then removed from each vial after one minute of stirring, added into the wells of a clean microplate via a pipette, and placed in a plate reader to obtain a baseline measurement of OD at 664 nm. Subsequent triplicate samples were removed from the vials after each hour of irradiation up to 8 hours to establish data points for determining the rate of MB color clearance.

The results showed that coating (1) exhibited about 62% MB color clearance after 1-hour of irradiation and about 85% MB color clearance after 3-hour of irradiation. By contrast, coating (2) exhibited only about 20% MB color clearance after 3-hour of irradiation and only about 57% MB color clearance after 8-hour of irradiation.

Example 7

Methylene Blue Assay by X-Ray

A radiolytic assay was developed to measure the influence of X-ray on generation of reactive oxygen species from coatings containing a polymer and a metal oxide.

The bottoms of the wells in cell culture microplates were coated with various compositions containing titanium tetraisopropoxide and PDMS and then filled with 200 µl of a MB solution in the same manner as described in Example 5. The optical density of the solution was read in a plate reader at a wavelength of 664 nm. Three to four replicates were made for each coating. Non-coated polystyrene wells and polystyrene wells coated with Degussa P25 titanium dioxide were used as controls. The microplates were subject to flashes of radiation from a medical (veterinary) X-ray unit (Bennett X-ray Technologies, Copiague, N.Y.) operating at 110 kVp, 150 milliamperes (mAs), and 0.40 second exposures (i.e., 60.0 mAs/flash) and emitting X-ray having a wavelength of at least about 0.11 nm. For first set of flash exposures, 69 kVp, 150 mAs and 0.045 second exposures were used. The OD of the microplates was read at 664 nm after various repeated exposures. The changes in optical density of the MB were plotted as a function of radiation exposure in mAs. A single canine lateral pelvis X-ray exposure with 6.8 mAs at 69 kVp was used as a reference for this equipment and x-ray source working distance.

Coatings prepared from compositions containing titanium tetraisopropoxide and PDMS in which titanium tetraisopropoxide was about 66.6%, 94.7%, or 97.4% of the total volume of titanium tetraisopropoxide and PDMS were tested in this assay. The results showed that the MB color clearance by flash radiolysis increased while the levels of titanium tetraisopropoxide increased from 66.6 vol % to 97.4 vol %. By contrast, no appreciable MB clearance was observed for non-coated polystyrene wells and wells coated with Degussa P25 titanium dioxide.

Example 8

Bacterial Growth and Fibroblast Growth and Surface Morphology Assays

Assays were developed to quantify the influence of silver doping of titanium oxide coatings with and without about 13% additional poly(dimethylsiloxane) on plankton growth of bacteria. The influence of heat treatment on the surface morphology of coatings applied to titanium alloy implants was evaluated by scanning electron microscopy.

Coatings were formulated with and without functionalized polydimethylsiloxane doped with titanium alkoxides and 25% silver neodecanoate in xylene and suspended in a mixture of polar and non-polar solvents. Ten % solutions were used to coat the bottom of 96-well cell culture microplates as described earlier (J Biomed Mater Res A 2007; 83A(3):853-860).

Bacterial growth assay: To determine the antimicrobial properties of the coatings, the change in optical density (OD) within microplates filled with 200 µl of Luria-Bertani broth inoculated with *Staph. aureus* ($1.2 \times 10^4$ CFU/ml) was measured every 15 minutes for 20 hrs to establish growth curves. Onset time was defined within the exponential growth phase as 0.2 OD at 578 nm. Polystyrene, titanium oxide, pure silver coatings and Degussa P25 titanium dioxide photocatalyst were used as controls.

Human cell growth assays: To measure influence of coatings on human dermal fibroblast proliferation, seeded microplates were incubated at 37° C. with 10% $CO_2$ for 48 hours, after which 10 µl of WST-1 (Roche Applied Science, Indianapolis, Ind.) was added into each well and incubated for 3 hours at 37° C. The optical density within each well, resulting from the cellular metabolism of the tetrazolium salt, was quantified using a microplate reader for absorbance at 440 nm and plotted.

Surface Analysis: Coated microplates were characterized by optical microscopy. An optimized coating (e.g., about 0.2 wt % silver) was selected from the bioresponse results and used to dip coat medical grade titanium alloy rod stock (ASTM F136 Ti6Al4V Eli Grade 5) and air dried. To produce samples with reduced organic surface composition, hybrid coated implants were heated on a hot plate to 400° C. in air for 2 hours. Scanning Electron Microscopy (SEM) was used to establish surface morphology of the coating and implants.

Planktonic bacterial growth was disrupted with concentration of Ag over 0.05 wt % for hybrids (FIG. 1). No bacterial growth was detected with Ag concentrations at above 0.09% for a period of 20 hours. Coatings without polymer required higher concentrations of Ag to prevent bacterial growth. Fibroblast growth was not significantly reduced with an Ag concentration of about 0.2%, so this concentration was selected as the optimized hybrid for implant coatings. The optimized coating had a phase separated microstructure. The hybrid coated implants had a smooth appearance with micro porous texture, while heating introduced a reticular morphology under SEM, as organic groups were decomposed.

Other embodiments are in the claims.

What is claimed is:

1. A composition comprising a metal oxide, prepared by a process comprising:
   providing a polymer and a metal oxide precursor in a solvent;
   co-solidifying the polymer and the metal oxide precursor to form a component of the composition by:
      removing the solvent from both the polymer and the metal oxide precursor, and
      contacting the polymer and the metal oxide precursor with a gas;
   wherein the metal oxide precursor is contacted with substantially no water, acid or base other than water, acid or base present in the gas; the metal oxide has amorphous structure; and the composition displays photocatalytic activity upon irradiation of light having wavelength of x-ray to infrared.

2. The composition of claim 1, wherein the composition has a maximum absorption peak at a wavelength of from about 500 nm to 1,100 nm.

3. The composition of claim 1, wherein the composition has a maximum absorption peak at a wavelength of from about 600 nm to 1,100 nm.

4. The composition of claim 1, wherein the metal oxide comprises a titanium oxide, a vanadium oxide, a zinc oxide, a zirconium oxide, a silver oxide, or a tantalum oxide.

5. The composition of claim 1, wherein the polymer comprises a polysiloxane, a polyurethane, a poly(ethylene oxide), a polyacrylamide, a polypeptide, a polysaccharide, or a combination or a copolymer thereof.

6. The composition of claim 5, wherein the polymer comprises a poly(dimethylsiloxane).

7. The composition of claim 6, wherein the polymer comprises a functionalized poly(dimethylsiloxane).

8. The composition of claim 7, wherein at least a portion of the functionalized poly(dimethylsiloxane) is cross-linked while forming a metal oxide from the metal oxide precursor.

9. The composition of claim 1, wherein the composition is in the form of a coating on a surface of an object.

10. The composition of claim 9, wherein the object is a medical device.

11. The composition of claim 9, wherein the object is a medical implant.

12. The composition of claim 1, wherein the process further comprises heating the composition to 400 degrees Celsius. to form a polysiloxane and metal oxide composition.

* * * * *